(12) United States Patent
Ley et al.

(10) Patent No.: US 7,518,280 B2
(45) Date of Patent: Apr. 14, 2009

(54) METHOD AND SYSTEM FOR SELECTIVELY OPERATING AN ELECTRIC MOTOR

(75) Inventors: Bruce C. Ley, Ossian, IN (US); Michael R. Barone, Fort Wayne, IN (US)

(73) Assignee: General Electric Company, Schenectady, NY (US)

(*) Notice: Subject to any disclaimer, the term of this patent is extended or adjusted under 35 U.S.C. 154(b) by 536 days.

(21) Appl. No.: 11/311,529

(22) Filed: Dec. 19, 2005

(65) Prior Publication Data

US 2007/0138985 A1    Jun. 21, 2007

(51) Int. Cl.
*H02K 19/12* (2006.01)

(52) U.S. Cl. .................. 310/185; 310/216; 310/254; 318/773

(58) Field of Classification Search ............ 310/179, 310/184, 185, 195, 194, 198, 210, 216, 254; 318/773
See application file for complete search history.

(56) References Cited

U.S. PATENT DOCUMENTS

| | | | |
|---|---|---|---|
| 3,794,870 A | * | 2/1974 | Broadway et al. ........... 310/180 |
| 3,980,909 A | * | 9/1976 | Klein ........................... 310/50 |
| 4,013,909 A | | 3/1977 | Broadway et al. |
| 4,127,787 A | * | 11/1978 | Auinger ....................... 310/184 |
| 4,227,136 A | | 10/1980 | Roesel, Jr. |
| 4,600,873 A | | 7/1986 | Roesel, Jr. et al. |
| 4,928,051 A | | 5/1990 | Demeter et al. |
| 6,169,354 B1 | | 1/2001 | Springer et al. |
| 6,255,755 B1 | | 7/2001 | Fei |
| 6,638,122 B1 | | 10/2003 | Griffith, Sr. |
| 6,844,648 B2 | | 1/2005 | Luttrell et al. |
| 7,002,275 B2 | | 2/2006 | Hans |
| 2007/0138985 A1 | * | 6/2007 | Ley et al. .................... 318/254 |

\* cited by examiner

*Primary Examiner*—Karl Tamai
*Assistant Examiner*—David W. Scheuermann
(74) *Attorney, Agent, or Firm*—Armstrong Teasdale LLP

(57) ABSTRACT

A method for selectively operating an electric motor in one of a first pole configuration and a second pole configuration is provided. The first pole configuration has a first phase winding structure, a second phase winding structure and a third phase winding structure. The method includes energizing each of the first phase winding structure, the second phase winding structure and the third phase winding structure to operate the electric motor in the first pole configuration. The first phase winding structure is reconfigured to form a first phase, a second phase and a third phase of the second pole configuration. The first phase winding structure is energized and each of the second phase winding structure and the third phase winding structure is de-energized to operate the electric motor in the second pole configuration.

11 Claims, 7 Drawing Sheets

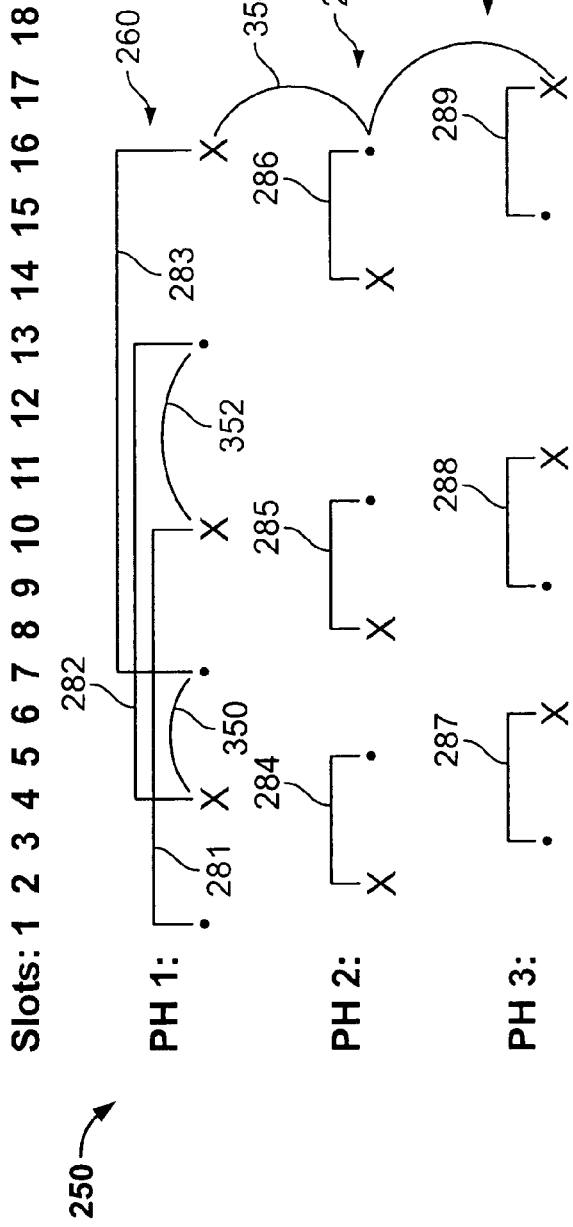
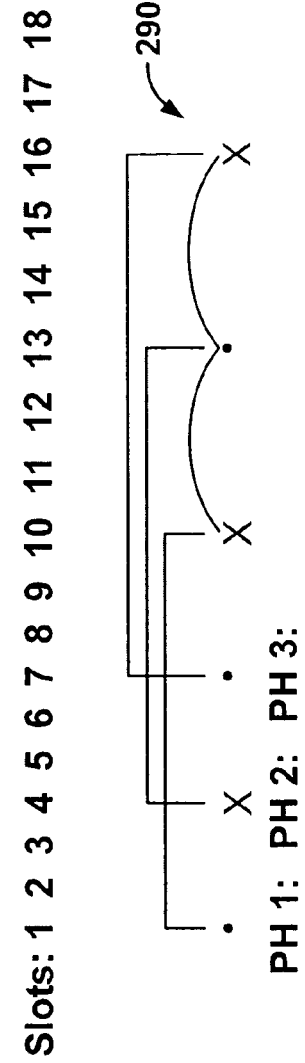
FIG. 7
FIG. 8

METHOD AND SYSTEM FOR SELECTIVELY OPERATING AN ELECTRIC MOTOR

BACKGROUND OF THE INVENTION

This invention relates generally to electric motors and, more particularly, to a method and system for selectively operating an electric motor in a first pole configuration or a second pole configuration.

Pole-changing motors have been used to supply multiple speeds in washing machines. These motors have two sets of windings for different pole structures wound into one stator. Typical induction pole-changing motors are limited to speed ratios of about 1.5:1 (4/6 pole motors), 2:1 (2/4 pole motors) or, at very costly penalties, 8:1 (2/16 pole motors). These motors typically have a significant amount of winding and stator material since only one set of windings is energized at a given speed while the other winding set remains de-energized or idle. Further, placing two pole winding sets within the stator necessitates very large stator slots, which results in inefficient use of steel material within the stator core. Finally, this construction results in a motor capable of operating at a limited number of discrete speeds.

Variable speed induction motors and electronically commutated motors wherein a motor speed is controlled electronically to vary the frequency of the power supplied to the motor are practically limited to a speed ratio of about 10:1. The low speed of the variable speed motor or the electronically commutated motor is limited by the loss of motor efficiency and speed control while operating at frequencies below 30 Hz, while the high speed is typically limited by the impedance, stator losses of the motor and/or computational speed of the control at frequencies above 300 Hz.

Universal motors have also been used to achieve variable speed with a high-speed ratio. This construction, however, has significant reliability limitations due to the commutators and brushes required to excite the armature. Additionally, universal motors produce a commutation noise that is undesirable.

BRIEF DESCRIPTION OF THE INVENTION

In one aspect, the present invention provides a method for selectively operating an electric motor in one of a first pole configuration and a second pole configuration. The first pole configuration has a first phase winding structure, a second phase winding structure and a third phase winding structure. The method includes energizing each of the first phase winding structure, the second phase winding structure and the third phase winding structure to operate the electric motor in the first pole configuration. The first phase winding structure is reconfigured to form a first phase, a second phase and a third phase of the second pole configuration. The first phase winding structure is energized and each of the second phase winding structure and the third phase winding structure is de-energized to operate the electric motor in the second pole configuration.

In another aspect, the present invention provides an electric motor. The electric motor is configured to operate in a first 3-phase configuration. Each of a first phase winding structure, a second phase winding structure and a third phase winding structure energized in the first 3-phase configuration. The electric motor is further configured to operate in a second 3-phase configuration. The first phase winding structure is energized and each of said second phase winding structure and said third phase winding structure is de-energized in the second 3-phase configuration. The electric motor is configured to switch between the first 3-phase configuration and the second 3-phase configuration.

In another aspect, the present invention provides a stator assembly for an electric motor. The stator assembly includes a plurality of stator laminations. Each stator lamination defines a plurality of stator winding slots that extend radially outwardly from an inner edge of the stator lamination. Adjacent stator winding slots define a tooth. The plurality of stator laminations is coupled together to form the stator assembly having a plurality of winding slots each extending between a first end and a second end of the stator assembly. A first phase winding structure is wound through a first set of stator winding slots. An end turn between an outgoing winding slot and an ingoing winding slot spans nine teeth defined on an outer stator lamination. A second phase winding structure is wound through a second set of stator winding slots different than the first set of stator winding slots. An end turn between an outgoing winding slot and an ingoing winding slot spans three teeth defined on the outer stator lamination. A third phase winding structure is wound through a third set of stator winding slots different than the first set of stator winding slots and the second set of stator winding slots. An end turn between an outgoing winding slot and an ingoing winding slot spans three teeth defined on the outer stator lamination.

BRIEF DESCRIPTION OF THE DRAWINGS

FIG. 7 is a schematic illustration of phase winding structures for motor operation in a 6 pole, 3 phase operating configuration;

FIG. 8 is a schematic illustration of a phase winding structure for motor operation in a 2 pole, 3 phase operating configuration;

DETAILED DESCRIPTION OF THE INVENTION

The present invention provides a method and apparatus for achieving speed ratios exceeding 10:1 by winding and connecting the windings of a variable speed motor. In one embodiment, the speed ratio approaches 30:1 using a single set of windings that operate as a 2 pole motor and a 6 pole motor. By winding and connecting the windings of the variable speed motor, according to the present invention, a large speed range is provided with a significant decrease in use of motor electromechanical material. Further, by laying out the lamination as a hexagonal configuration, larger stator slots can be used to allow larger wire sizes to be inserted for balancing the 6 pole 3 phase configuration.

The present invention is described below in reference to its application in connection with and operation of a variable speed motor having a single set of windings to operate selectively as a 2 pole motor and a 6 pole motor. However, it will be obvious to those skilled in the art and guided by the teachings herein provided that the invention is likewise applicable to any suitable variable speed motor, electronically commutated motor, standard single phase motor and 3 phase pole motor.

Figure 1:
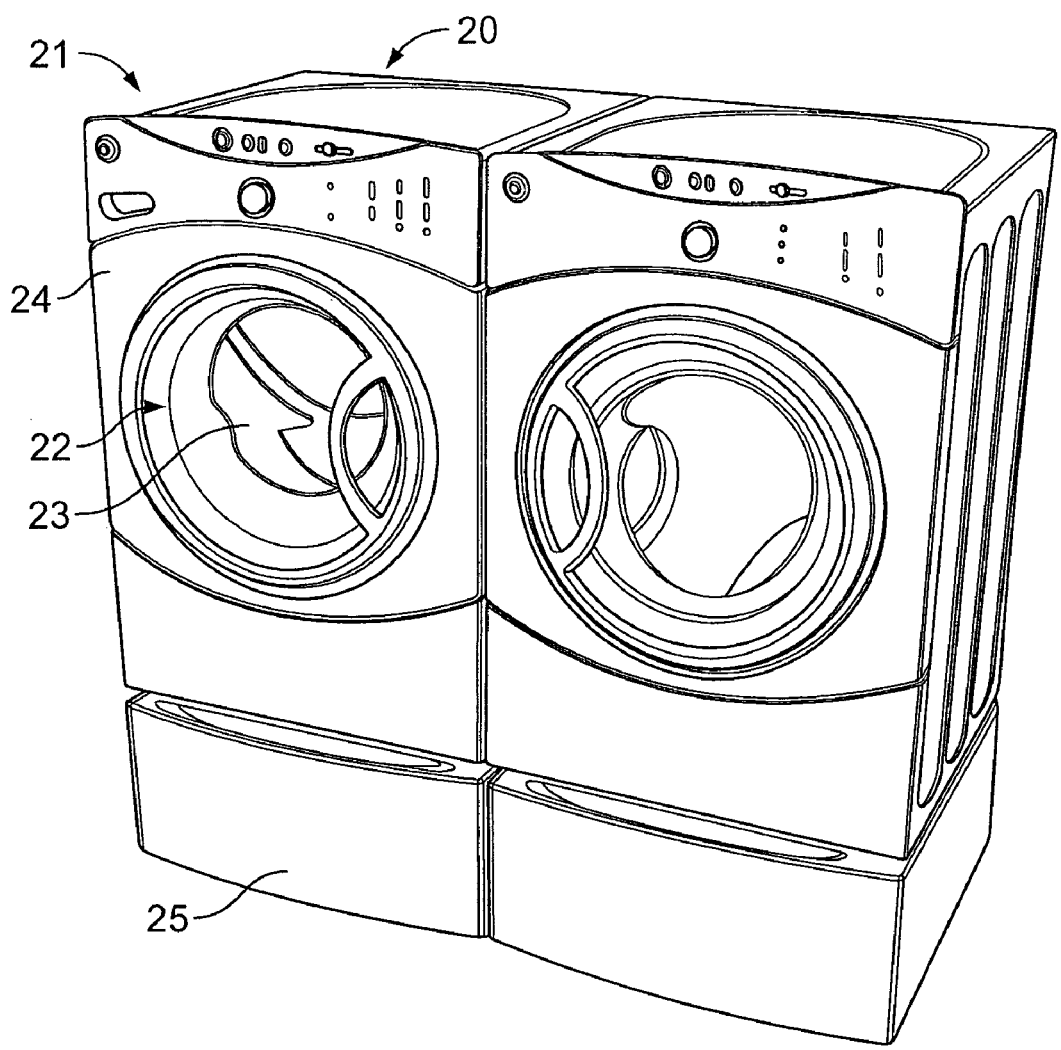
FIG. 1 is a perspective view of an exemplary washing machine.

FIG. 1 illustrates an exemplary horizontal-axis washing machine 20 and a dryer arranged side by side. Washing machine 20 includes a cabinet 21 defining a cavity 22 and a basket or drum 23 positioned within cavity 22. A door 24 is hingedly coupled to cabinet 21 and movable about a hinge (not shown) between an open position (not shown) facilitating access to drum 23 and a closed position (shown in FIG. 1) forming a sealed enclosure over drum 23. A base unit 25 supports cabinet 21 thereon.

It is apparent to those skilled in the art and guided by the teachings herein provided that the present invention is applicable not only to horizontal-axis washing machines, such as washing machine 20, but to other forms of home appliances as well. Therefore, washing machine 20 is provided by way of illustration rather than limitation. Accordingly, the following description is for illustrative purposes only, and there is no intention to limit application of the present invention to any particular home appliance, such as washing machine 20.

In the exemplary embodiment, cabinet 12 includes a front face 26, a rear panel 28 (shown in FIG. 2), a pair of side panels 30 spaced apart from each other by rear panel 28, a bottom panel 32 (shown in FIG. 2), and a top panel 34. In one embodiment, front face 26 curves outwardly with respect to top panel 34, i.e. front face 26 curves forward from cabinet 12. In another embodiment, front face 26 also curves upwardly.

Figure 2:
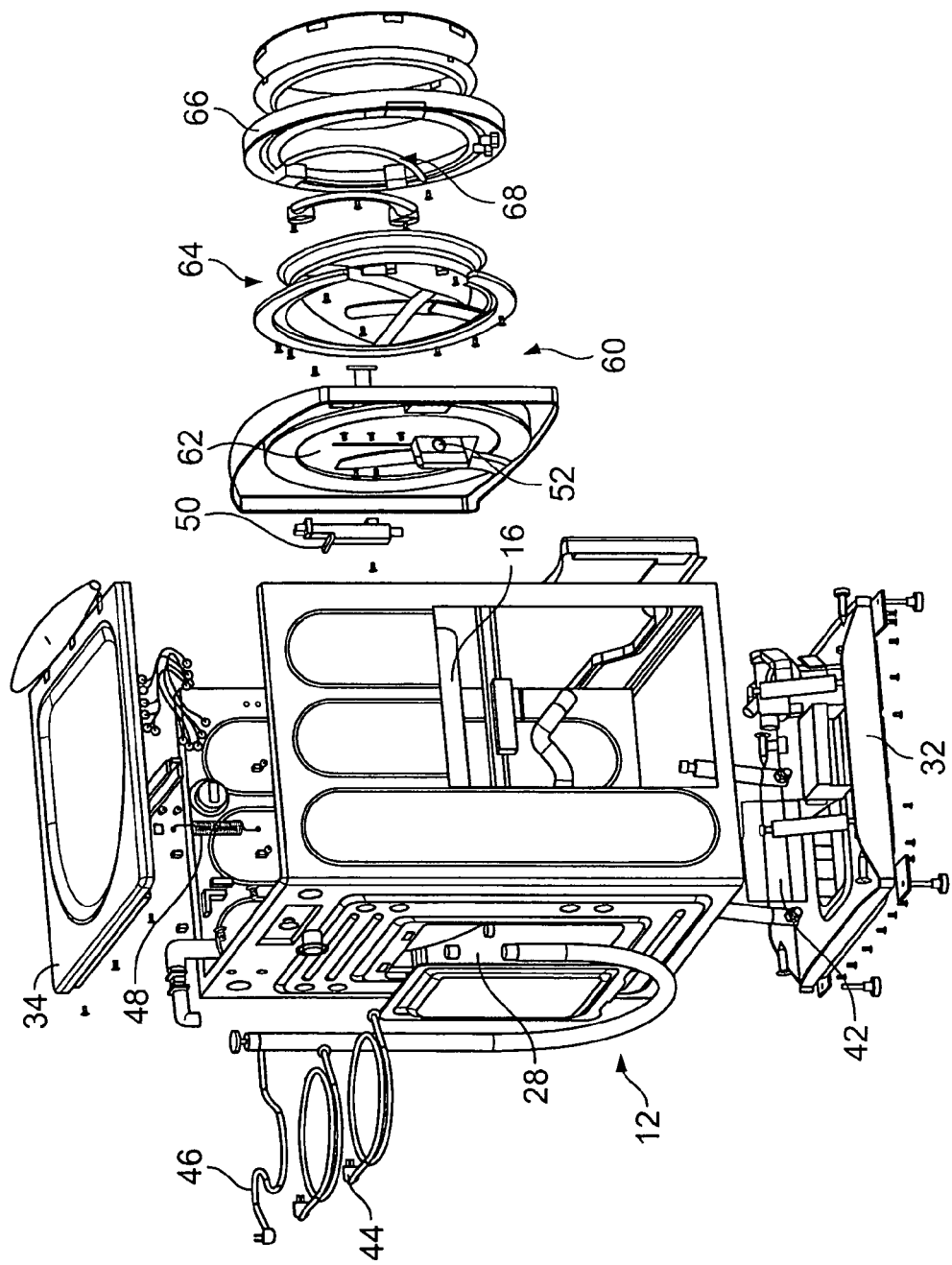
FIG. 2 is an exploded view of the washing machine shown in FIG. 1.

FIG. 2 is an exploded view of washing machine 20 shown in FIG. 1. Washing machine 20 includes a cylindrical wash tub 40 and a motor 42 positioned within cabinet 21. Wash tub 40 receives drum 23 (shown in FIG. 1) rotatably mounted therein, and drum 23 can receive clothing articles and other fabrics to be washed. Motor 42 drives drum 23 to rotate around a substantially horizontal axis through a pulley wheel (not shown) and a belt (not shown).

In the exemplary embodiment, washing machine 20 includes a plurality of water pipes 44 and power lines 46 mounted on rear panel 28. Water pipes 44 are coupled in communication with wash tub 40 for channeling water into and/or out from wash tub 40. Power lines 46 are electrically coupled to motor 42 and other electrical components for providing electric power. Washing machine 20 also includes a plurality of spaced apart tub suspension elements 48, such as springs, mounted on top panel 34 or bottom panel 32, respectively. Each tub suspension element 48 is directly or indirectly attached to wash tub 40 such that wash tub 40 is suspended within cabinet 21.

In the exemplary embodiment, door 24 is coupled to cabinet 21 and forms a part of front face 26 (shown in FIG. 1). Specifically, door 24 is coupled to cabinet 21 through a hinge 50 mounted on one of side panels 30, and door 24 can be kept at the closed position by a latch 52 mounted on another one of side panels 30. Door 24 includes a door panel 60 defining an opening 62, a transparent window 64 mounted within opening 62, a door frame 66 surrounding window 64, and a door handle 68 mounted on door panel 60. Opening 62 is substantially complementary in shape with respect to window 64, such that opening 62 facilitates observing cavity 22 and/or drum 23 through window 64.

Figure 3:
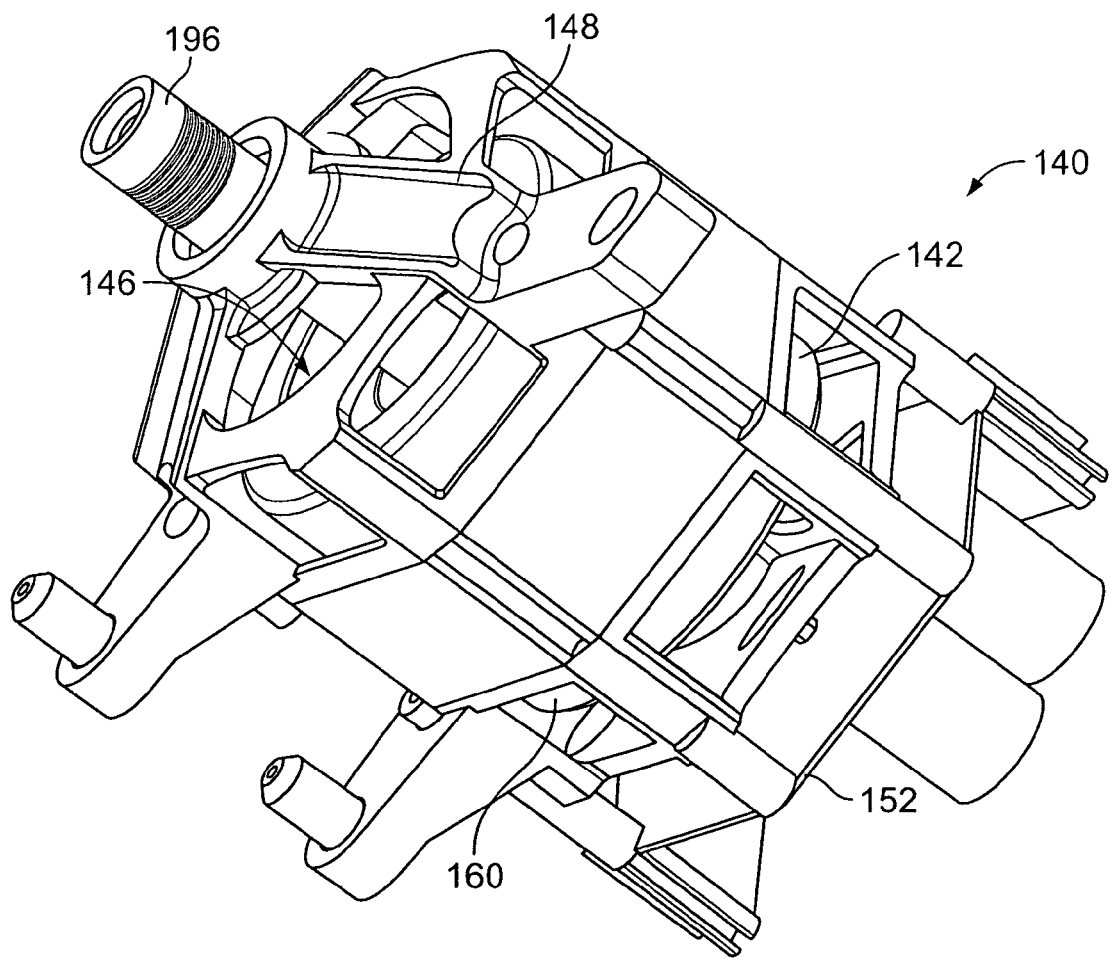
FIG. 3 is a perspective view of an exemplary motor that may used in the washing machine shown in FIG. 1.
Figure 4:
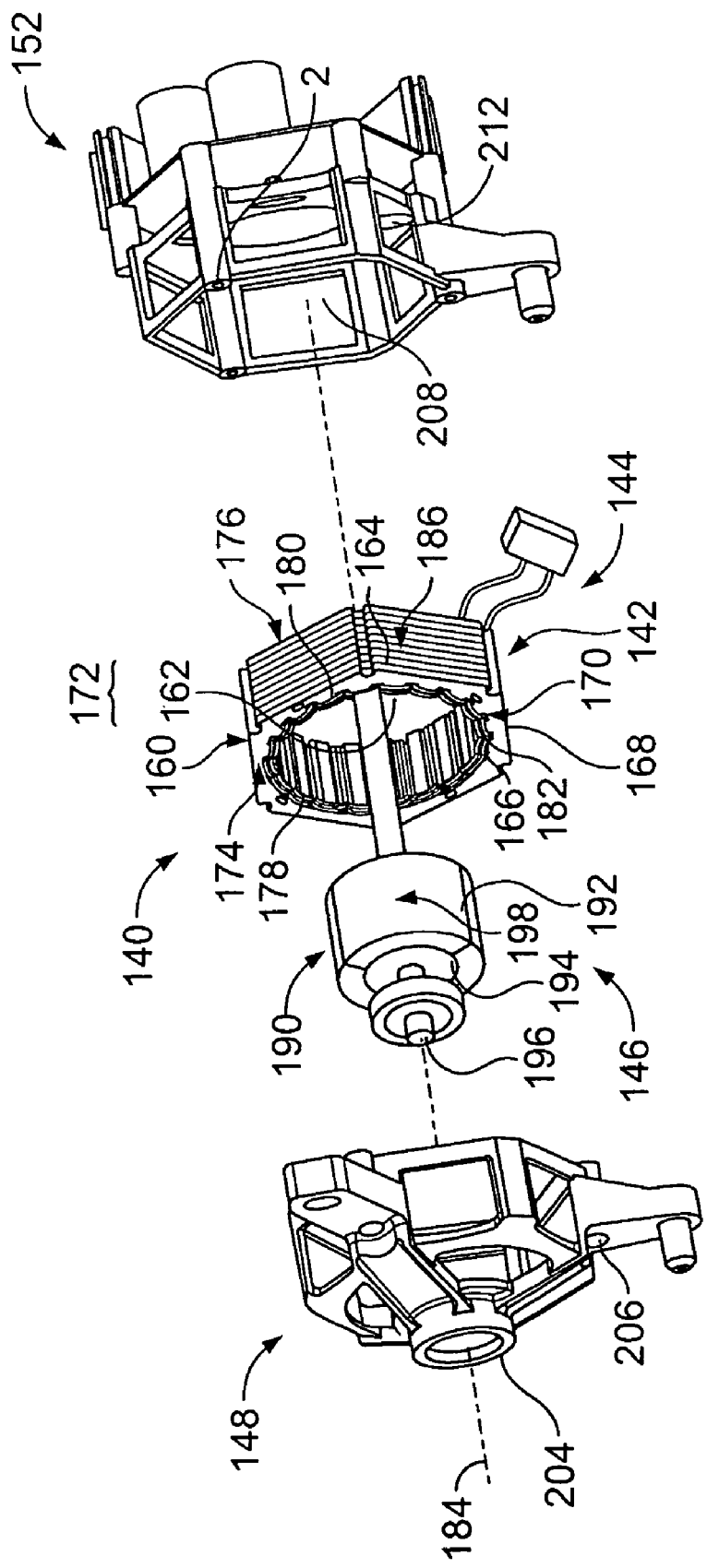
FIG. 4 is an exploded view of the motor shown in FIG. 3.

FIG. 3 is a perspective view of a motor 140 suitable for use within washing machine 20. FIG. 4 is an exploded perspective view of motor 140 shown in FIG. 3. Referring to FIGS. 3 and 4, motor 140 includes a stator assembly 142 with a harness assembly 144, and a rotor assembly 146. Motor 140 includes a first end shield 148 and an opposing second end shield 152 each coupled directly to stator assembly 142. In one embodiment, motor 140 is an electronically commutated motor.

Stator assembly 142 and rotor assembly 146 are positioned between first end shield 148 and second end shield 152. Stator assembly 142 includes a stator core 160 with a stator bore 162 extending therethrough. Stator core 160 is fabricated from at least one stator lamination 164. Stator lamination 164 has an inner edge 166, an outer edge 168 and an intermediate area 170 extending between inner edge 166 and outer edge 168. In one embodiment, stator core 160 includes a plurality of stacked stator laminations 164. Outer edges 168 of stator laminations 164 are aligned to form a substantially continuous stator body 172 having first end 174 and second end 176. Inner edges 166 of stator laminations 164 are aligned to form stator bore 162 and each inner edge 166 defines a plurality of stator winding slots 178 that extend radially outwardly from stator bore 162.

Figure 5:
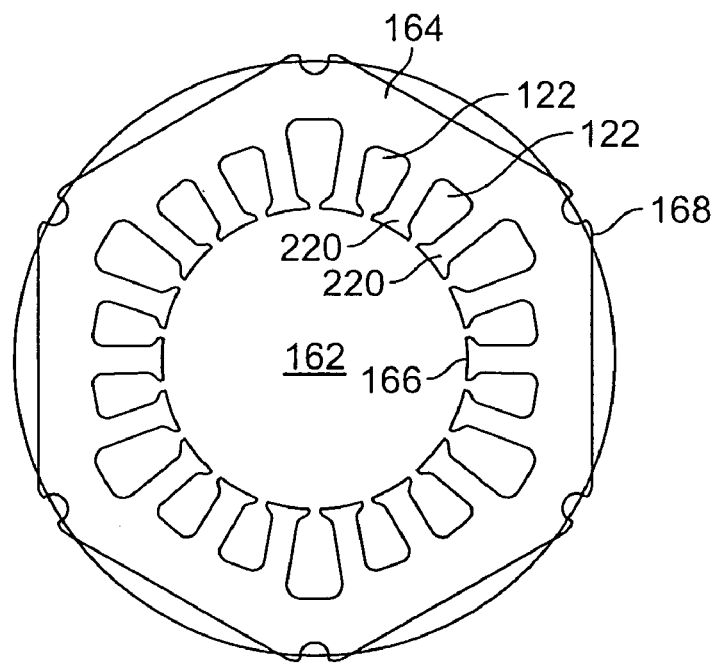
FIG. 5 is a top view of a stator lamination for the motor shown in FIG. 4.

Stator core 160 provides support for a plurality of stator coils 180 formed from insulated conductive wire inserted into stator winding slots 178. Coils 180 form end turn regions 182 positioned at first stator end 174 and second stator end 176 of stator body 172. FIG. 5 is an enlarged top view of a stator lamination 164. Specifically, stator bore 162 is formed by punching a center of a lamination 164 from each stator lamination 164 and the subsequent stacking of the stator laminations 164. In one embodiment, stator bore 162 is substantially cylindrical about a central axis 184. A housing (not shown) is positioned about motor 140 to prevent undesirable exposure to an exterior environment.

Rotor assembly 146, such as an ECM rotor, is positioned within stator bore 162 and includes a rotor core 190, a plurality of pole sections 192, a rotor mounting assembly 194, a rotor shaft 196 and an outer rotor surface 198. Rotor shaft 196 is substantially concentric about axis 184 and rotor shaft 196 axially extends through rotor mounting assembly 194. Rotor mounting assembly 194 supports magnetic elements of pole sections 192. Rotor assembly 146 is fabricated from a conductive material, such as a non-magnetic conductive metal including, without limitation, aluminum, copper or GLID-COP® dispersion strengthened copper (GLIDCOP is a trademark of OMG Americas). Rotor assembly 146 can be cast, fabricated or brazed. In one embodiment, as shown in FIG. 4, rotor assembly 146 includes a permanent magnet rotor. Alternatively, rotor assembly 146 includes a cast aluminum rotor.

Rotor shaft 196 extends through rotor core 190 formed by a plurality of rotor laminations 199. Rotor assembly 146, as shown in FIG. 4, is substantially cylindrical and is mounted within stator bore 162, e.g., using a cantilever structure and/or bearings, so that rotor assembly 164 is coaxial with stator bore 162. Particularly, rotor assembly 164 is rotatably mounted within stator bore 162 so that rotor assembly 164 rotates relative to stator assembly 142.

First end shield 148 has a shaft hole 204 and at least one fastener hole 206 therethrough. Second end shield 152 may have a shaft hole 208 and at least one fastener hole 210 therethrough. In one embodiment, first end shield 148 and second end shield 152 have a bearing support (not shown) with a bearing (shown on the end of the shaft facing endshield 148) therein. Thus, when rotor assembly 146 is mounted within stator bore 162, rotor shaft 196 extends through first end shield 148 and second end shield 152 and is rotatably supported by bearings.

In another embodiment, second end shield 152 has a post hole 212 allowing harness connector 144 to interface with a control (not shown). In another embodiment, first end shield 148 and/or second end shield 152 are cast aluminum. In a further embodiment, first end shield 148 and/or second end shield 152 are made of an electrically insulating material, such as plastic. Thus, first end shield 148 and second end shield 152 are coupled to first stator body end 174 and second stator body end 176, respectively.

FIG. 5 is a top view of stator lamination 164. In one embodiment, stator lamination 164 includes a plurality of teeth 220 defining a plurality of stator winding slots 222. Teeth 220 are formed at inner edge 166 of each lamination 164. Stator winding slots 222 are configured to receive and secure conducting elements (not shown) therein. For example, stator windings (not shown) are inserted into stator winding slots 222, and the stator windings form a selected even number of poles, e.g., two poles, four poles or six poles. In one embodiment, outer edge 168 of stator lamination 164 defines an outer perimeter having a general polygonal cross-sectional area and inner edge 166 has a general circular inner perimeter forming a portion of stator bore 162.

Referring to FIG. 5, in one particular embodiment, stator lamination 164 has a hexagonal cross-section and defines eighteen (18) stator winding slots 122. In this embodiment, a 6-pole, 3-phase and a 2-pole, 3-phase winding structure is provided. As shown in FIG. 5, at each of the six points or intersections of the sides of the hexagon-shaped stator lamination 164, a corresponding stator winding slot 122 is larger and/or deeper relative to the remaining stator winding slots 122. As a result, a wire having a larger size, such as 20 gauge wire, can be used for one phase of the winding structure while maintaining a suitable flux density around the stator yoke. The hexagonal cross-section of stator lamination 164 facilitates fabrication of stator laminations 164 by allowing nesting of stator laminations 164 during a stamping process, thereby minimizing scrap material. It is apparent to those skilled in the art and guided by the teachings herein provided that stator lamination 164 may have any suitable cross-sectional shape. For example, stator lamination 164 may have a square cross-section for a 4 pole winding structure or an octagonal cross-section for an 8 pole winding structure.

Figure 6:
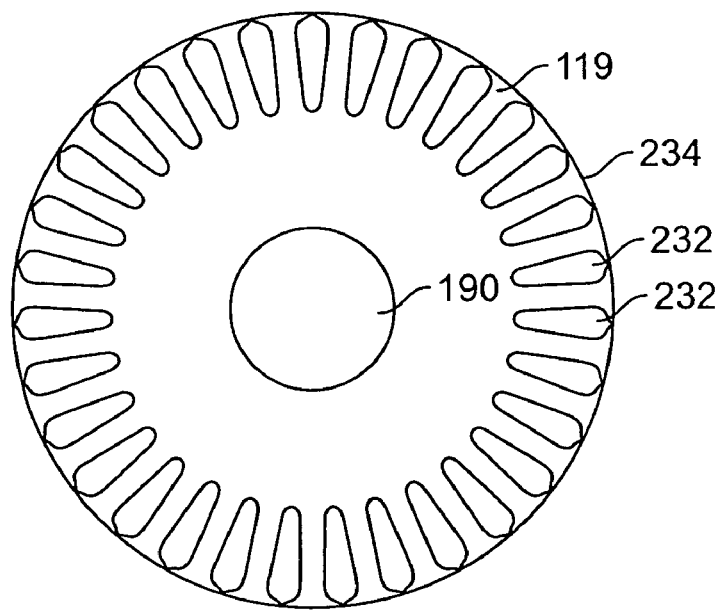
FIG. 6 is a top view of a rotor lamination for the motor shown in FIG. 4.

FIG. 6 is a top view of a rotor lamination 199. A plurality of rotor laminations 199 are coupled together to form rotor core 190. Each rotor lamination 199, as shown in FIG. 6, is positioned within a stator bore 162 defined in a corresponding stator lamination 164, as shown in FIG. 5. In one embodiment, rotor lamination 199 defines a plurality of slots 232. Slots 232 are formed at outer edge 234 of each rotor lamination 199. In a particular embodiment, rotor lamination 199 is designed to compromise between a 2 pole rotor lamination and a 6 pole lamination and provide a flux density to facilitate the prevention or reduction of saturation within rotor lamination 199. In this embodiment, rotor lamination 199 is designed to maximize the 6 pole performance efficiency and minimize fabrication costs.

FIG. 7 schematically illustrates a 6 pole, 3 phase "Y" connection diagram. Stator assembly 142 includes a winding structure 250, including a phase 1 winding structure 260, a phase 2 winding structure 270 and a phase 3 winding structure 280. In one embodiment, phase 1 winding structure 260 includes end turns that span nine teeth 220. To compensate for the longer end turns (higher impedance), a larger diameter wire is inserted in phase 1 stator winding slots. As shown in FIG. 7, phase 1 winding structure 260 includes a coil 282 inserted through phase 1 winding slots 1 and 10, a coil 284 inserted through phase 1 winding slots 4 and 13, and a coil 286 inserted through phase 1 winding slots 7 and 16.

Figure 9:
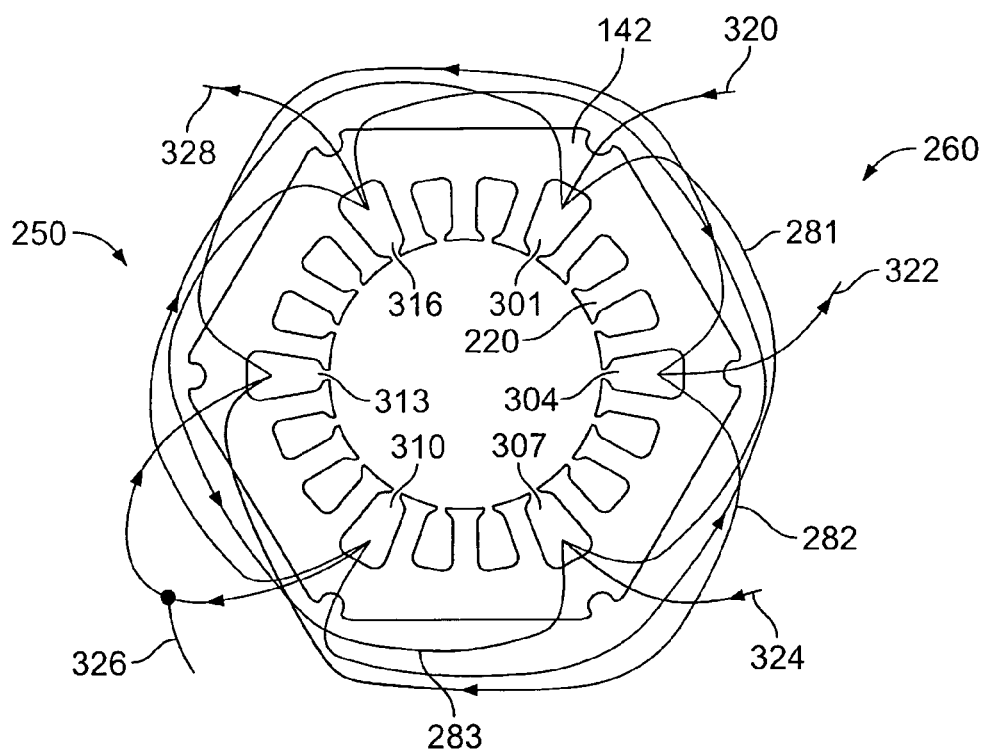
FIG. 9 is a top view of a stator assembly with a first phase winding structure.
Figure 10:
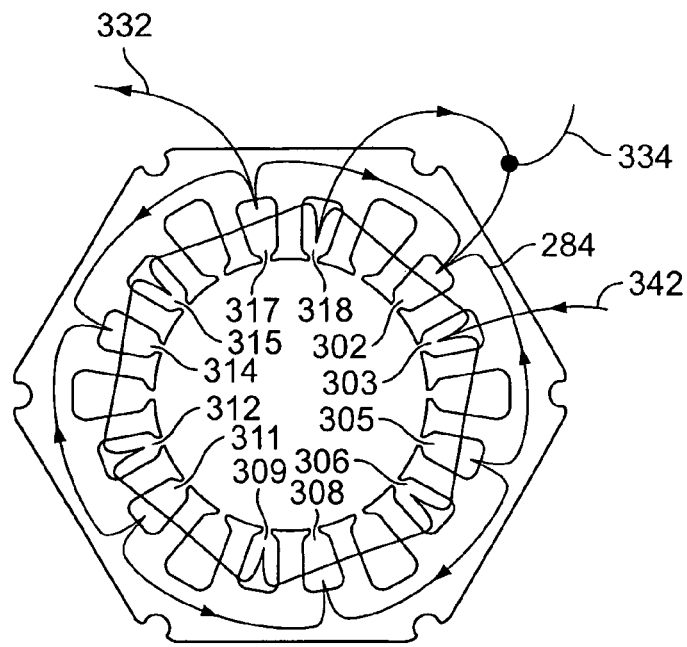
FIG. 10 is a top view of a stator assembly with a second phase winding structure and a third phase winding structure.

Referring further to FIG. 9, stator assembly 142 includes eighteen (18) stator winding slots, namely stator winding slots 301-318, corresponding to stator winding slots 1-18 shown in FIG. 7, respectively. Phase 1 winding structure 250 includes coil 281 inserted through stator winding slots 301 and 310; wire 282 inserted through stator winding slots 304 and 313; and wire 283 inserted through stator winding slots 307 and 316. A lead wire is connected to each coil at each stator winding slot 301, 304, 307, 310, 313 and 316. As shown in FIG. 9, a lead wire 320 is electrically coupled to coil 281 at stator winding slot 301; a lead wire 322 is electrically coupled to coil 282 at stator winding slot 304; a lead wire 324 is electrically coupled to coil 283 at stator winding slot 307; a lead wire 326 is electrically coupled to coil 282 at stator winding slot 310 and at stator winding slot 313; and a lead wire 328 is electrically coupled to coil 283 at stator winding slot 316.

In one embodiment, phase 2 winding structure 270 includes end turns that span three teeth 220. As shown in FIG. 7, phase 2 winding structure 270 includes a coil 284 inserted through phase 2 stator winding slots 1 and 5, a coil 285 inserted through phase 2 stator winding slots 8 and 11, and a coil 286 inserted through phase 2 stator winding slots 14 and 17. Referring further to FIG. 9, phase 2 winding structure 270 includes coil 284 inserted through stator winding slots 302, 305, 308, 311, 314 and 317. A lead wire 332 is electrically coupled to wire 284 at stator winding slot 317; and a lead wire 334 is electrically coupled to wire 284 at stator winding slot 302.

In one embodiment, phase 3 winding structure 280 includes end turns that span three teeth 220. As shown in FIG. 7, phase 3 winding structure 280 includes a coil 287 inserted through stator winding slots 3 and 6, a coil 288 inserted through stator winding slots 9 and 12, and a coil 389 inserted through stator winding slots 15 and 18. Referring further to FIG. 9, phase 3 winding structure 280 includes coil 287 inserted through stator winding slots 303, 306, 309, 312, 315 and 318. A lead wire 342 is electrically coupled to coil 287 at stator winding slot 303; and lead wire 334 is electrically coupled to coil 287 at stator winding slot 318. A suitable outside stator control (not shown) is electrically coupled to each of the phases of the 6 pole, 3 phase structure. As shown in FIG. 7, interpole connections are made using a jumper 350 coupled between stator winding slot 4 and 7 and a jumper 352 coupled between stator winding slot 10 and 13. Further, a jumper 354 electrically couples phase 1 winding structure 260, phase 2 winding structure 270 and phase 3 winding structure 280.

FIG. 8 schematically illustrates a 2 pole, 3 phase "Y" connection diagram. A 2 pole, 3 phase winding structure 290 is generated by disconnecting phase 2 winding structure 270 and phase 3 winding structure 280 to de-energize phase 2 and phase 3 of the first pole configuration. The phase 1 winding structure 260 is reconfigured, as shown in FIG. 8, to form phase 1, phase 2 and phase 3 of the 2 pole, s phase operating configuration. The larger wire size in the phase 1 winding structure 260 increases the motor efficiency in the 2 pole operating configuration. Because the low number of turn counts allow for low impedance at high frequencies, the motor impedance is greatly reduced with all end turns effective. Thus, higher torque is provided at higher driving frequencies. Phase 1 winding structure 260 of the 6 pole, 3 phase winding structure is modified to define the 3 phase winding structure for the 2 pole winding arrangement. Phase 1 of the 2 pole winding structure includes a wire wound through stator winding slots 1 and 10; phase 2 includes a wire wound through stator winding slots 4 and 13; and phase 3 includes a wire wound through stator winding slots 7 and 16. A jumper 356 electrically couples phase 1 winding structure, phase 2 winding structure and phase 3 winding structure.

In one embodiment, a method for selectively operating an electric motor in one of a first pole configuration and a second pole configuration is provided. The method includes configuring the first pole configuration by forming a first phase winding structure, a second phase winding structure and a third phase winding structure. Each of the first phase winding structure, the second phase winding structure and the third phase winding structure is electrically coupled to a power source. Further, in one embodiment, a "Y" connection is formed including the first coil, the second coil and the third coil. In one embodiment, the motor is operatively coupled to an inverter.

In a particular embodiment, the first phase winding structure is formed by providing a stator assembly including a plurality of stator laminations coupled together to form a stator core. In this embodiment, the stator core defines eighteen (18) stator winding slots extending between a first end and a second end of the stator core. A first coil is wound between a first winding slot and a tenth winding slot. Similarly, a second coil is wound between a fourth winding slot and a thirteenth winding slot and a third coil is wound between a seventh winding slot and a sixteenth winding slot. The first coil is electrically coupled to the second coil and the second coil is electrically coupled to the third coil in the first pole configuration.

In one embodiment, the second phase winding structure is formed by winding a fourth coil between a second winding slot and a fifth winding slot, winding a fifth coil between a eighth winding slot and an eleventh winding slot, and winding a sixth coil between a fourteenth winding slot and a seventeenth winding slot. Further, the third phase winding structure is formed by winding a seventh coil between a third winding slot and a sixth winding slot, winding an eighth coil between a ninth winding slot and a twelfth winding slot, and winding a ninth coil between a fifteenth winding slot and an eighteenth winding slot.

The first phase winding structure is reconfigured to form a first phase, a second phase and a third phase of the second pole configuration. Each of the first phase, the second phase and the third phase is electrically coupled to the power source with the motor operating in the second pole configuration. The second phase winding structure and the third phase winding structure are de-energized during operation of the electric motor in the second pole configuration. In one embodiment, the first coil is decoupled from the second coil to reconfigure the first phase winding structure. In this embodiment, a control device, such as at least one relay is electrically coupled to and in operational control communication with each of the first phase winding structure, the second phase winding structure and the third phase winding structure to selectively activate one of the first pole configuration and the second pole configuration.

The above-described method and system provide a pole changer motor that facilitates a wide speed capability while providing a reduced material cost. More specifically, the winding configuration minimizes material cost while maximizing low speed and high speed operation. As a result, the method and system provide a high efficiency operation at low speed washing torques (6 pole operation) while maintaining high efficiency operation at high speed spin torques (2 pole operation).

Exemplary embodiments of a method and system for selectively operating an electric motor are described above in detail. The method and system are not limited to the specific embodiments described herein, but rather, steps of the method and/or components of the system may be utilized independently and separately from other steps and/or components described herein. Further, the described method steps and/or system components can also be defined in, or used in combination with, other methods and/or systems, and are not limited to practice with only the method and systems as described herein.

While the invention has been described in terms of various specific embodiments, those skilled in the art will recognize that the invention can be practiced with modification within the spirit and scope of the claims.

What is claimed is:

1. An electric motor configured to:
   operate in a first 3-phase configuration, each of a first phase winding structure, a second phase winding structure and a third phase winding structure energized in said first 3-phase configuration;
   operate in a second 3-phase configuration, said first phase winding structure energized and each of said second phase winding structure and said third phase winding structure de-energized in said second 3-phase configuration; and
   switch between said first 3-phase configuration and said second 3-phase configuration.

2. An electric motor in accordance with claim 1 wherein said first 3-phase configuration is configured to operate in a 6 pole configuration.

3. An electric motor in accordance with claim 1 wherein said second 3-phase configuration is configured to operate in a 2 pole configuration.

4. An electric motor comprising:
   a first phase winding structure;
   a second phase winding structure;
   a third phase winding structure;
   a first 3-phase configuration, wherein each of said first phase winding structure, said second phase winding structure, and said third phase winding structure are energized in said first 3-phase configuration;
   a second 3-phase configuration, wherein said first phase winding structure is energized and each of said second phase winding structure and said third phase winding structure are de-energized in said second 3-phase configuration; and
   a plurality of laminations coupled together to form a plurality of winding slots, each said winding slot extending radially outwardly from an inner edge of said lamination, wherein adjacent said winding slots define a tooth;
   wherein said electric motor is configured to switch between said first 3-phase configuration and said second 3-phase configuration.

5. An electric motor in accordance with claim 4, wherein said electric motor comprises a stator assembly.

6. An electric motor in accordance with claim 4, wherein said first phase winding structure is wound through a first set of said plurality of winding slots, wherein a first end turn between an outgoing winding slot and an ingoing winding slot spans at least three of said teeth;
   said second phase winding structure is wound through a second set of said plurality of winding slots, wherein a second end turn between an outgoing winding slot and an ingoing winding slot spans at least three of said teeth; and
   said third phase winding structure is wound though a third set of said plurality of winding slots, wherein a third end turn between an outgoing winding slot and an ingoing winding slot spans at least three of said teeth.

7. An electric motor in accordance with claim 6, wherein said first end turn spans more teeth than said second end turn and said third end turn.

8. An electric motor in accordance with claim 6, wherein said first phase winding structure comprises a wire having a wire size larger than said second winding structure and said third winding structure.

9. An electric motor in accordance with claim 6, wherein each said lamination has a hexagonal cross-section.

10. An electric motor in accordance with claim 9, wherein at least one winding slot corresponding to a corner of said hexagonal cross-section has a cross-sectional area greater than the area of another winding slot.

11. An electric motor in accordance with claim 9, wherein said first phase winding structure is wound through each of said winding slots corresponding to a corner of said hexagonal cross-section.

* * * * *